UNITED STATES PATENT OFFICE.

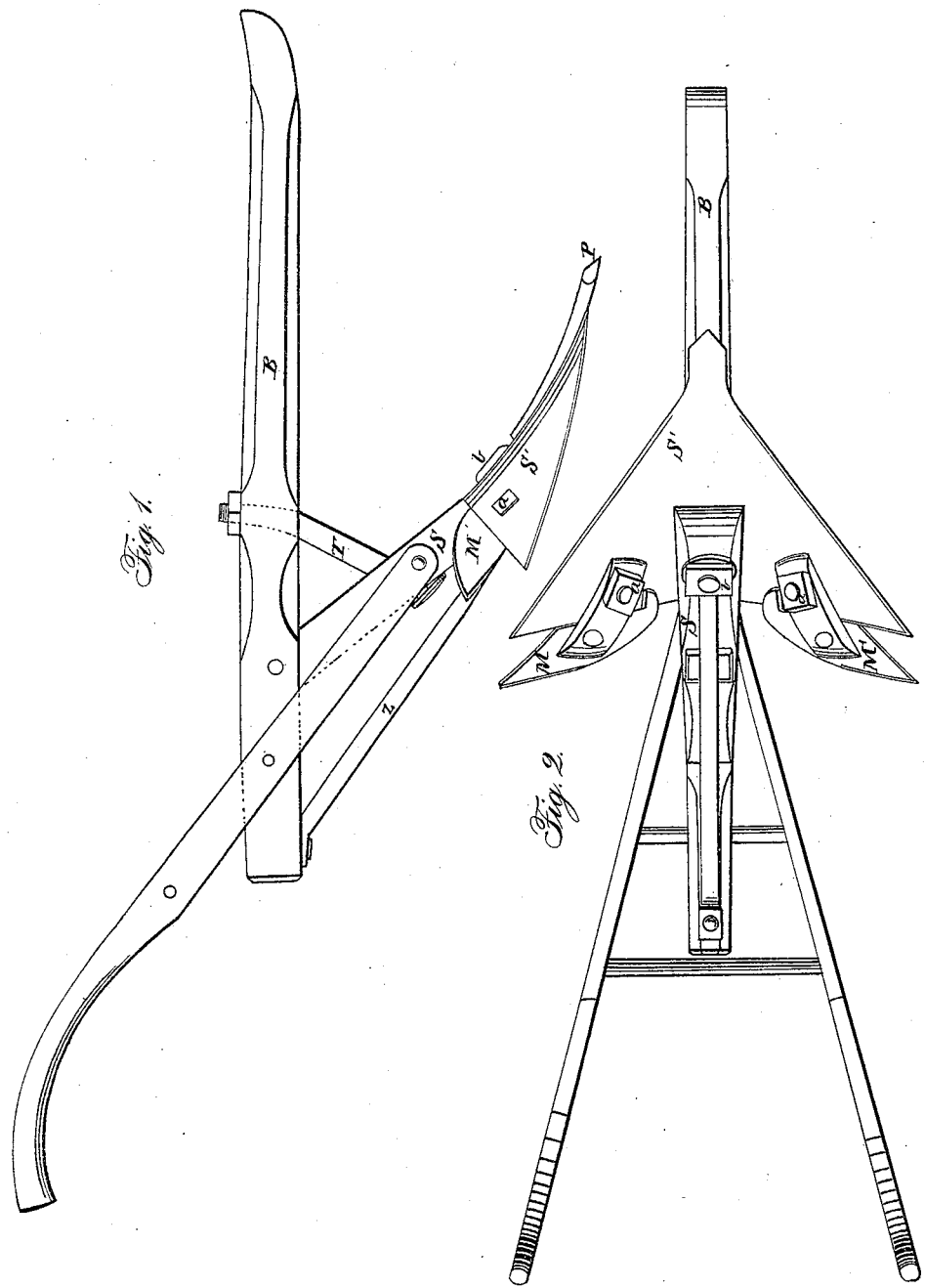

WILLIAM O'NEILL, OF PINE LEVEL, ALABAMA.

IMPROVEMENT IN PLOWS.

Specification forming part of Letters Patent No. 25,437, dated September 13, 1859.

*To all whom it may concern:*

Be it known that I, WM. O'NEILL, of Pine Level, in the county of Montgomery and State of Alabama, have invented a new and useful Improvement in Plows; and I do hereby declare that the following is a full, clear, and exact description of the same, reference being had to the annexed drawings, forming part of this specification, in the several figures of which similar characters of reference denote the same part.

Figure 1 is a side view of improved plows. Fig. 2 is a bottom view of the same.

The nature of my invention consists in attaching to the share of the plow, on each side of the stock, by a bolt, a movable section or small mold-board, for the purpose of throwing more dirt over the corn or rice, or whatever it is used for, when required by the continued growth of the article. The mold-boards are adjustable, and when not required may be taken off; or either one may be removed and only one of them used.

In the drawings, B is the beam; S, the stock; T and Z, braces of stock; S', the share, secured to the foot of stock S by bolt $b$; P, the point of plow; and M M', the adjustable mold-boards, attached to the share by bolts $a$.

The sections or mold-boards M M' are inclined toward their outer end, being much wider there than at the end near the stock. They are not used when plowing corn or rice for the first time, as the share will throw sufficient quantity of dirt over it; but as the growth increases, by attaching them by means of bolts $a$ they throw the additional quantity of dirt required by the advanced growth. These mold-boards have also a slight inclination forward at their outer edge, which serves to roll up the grass in front, instead of cutting it off and allowing it to fall behind the share; and these sections, being movable by means of bolts $a$, either one may be left off, as the case may require.

Having thus set forth my improvement, I claim—

The arrangement of the adjustable mold-boards M M', attached to the share by bolts $a$, and constructed as described, with braces Z and T, stock S, share S', and point P, substantially as and for the purposes specified.

In testimony whereof I have hereunto signed my name before two subscribing witnesses.

WM. O'NEILL.

Witnesses:
GEO. PATTEN,
JOHN S. HOLLINGSHEAD.